United States Patent [19]
Puppa et al.

[11] Patent Number: 5,778,003
[45] Date of Patent: Jul. 7, 1998

[54] LOOP-BACK DETECTION USING OUT-OF-BAND SIGNALLING

[75] Inventors: Gary Puppa, Kanata; Bruce Nolan, Ashton; François Bessette, Gatineau; Robert Hemmerich, Ottawa, all of Canada

[73] Assignee: Newbridge Networks Corporation, Kanata, Canada

[21] Appl. No.: 413,381

[22] Filed: Mar. 30, 1995

[51] Int. Cl.⁶ .................................................. G06F 11/00
[52] U.S. Cl. ............... 371/20.5; 371/20.1; 371/20.4; 370/249; 370/241; 370/242
[58] Field of Search ................... 371/20.5, 20.1, 371/20.6, 20.4; 370/13, 15, 50, 16.1, 85.12, 85.15; 375/213, 221, 215, 358, 224; 455/67.1, 9, 226.1, 115

[56] References Cited

U.S. PATENT DOCUMENTS

| | | | |
|---|---|---|---|
| 4,258,434 | 3/1981 | Glowinski et al. | 370/60 |
| 4,777,633 | 10/1988 | Fletcher et al. | 370/50 |
| 4,980,887 | 12/1990 | Dively et al. | 371/20.2 |
| 5,343,461 | 8/1994 | Barton et al. | 370/13 |
| 5,422,876 | 6/1995 | Turudic | 370/15 |

*Primary Examiner*—Phung M. Chung
*Attorney, Agent, or Firm*—Marks & Clerk

[57] ABSTRACT

A method is described for detecting a loopback condition in a trunk. A predetermined bit pattern is inserted in an outgoing channel, and a corresponding incoming channel is continually monitored to detect the presence of the predetermined bit pattern. In this way, premature restoration of faulty circuits can be prevented.

5 Claims, 2 Drawing Sheets

5,778,003

LOOP-BACK DETECTION USING OUT-OF-BAND SIGNALLING

BACKGROUND OF THE INVENTION

This invention relates to a method of detecting loopbacks on TDM (time division multiplex) trunks, such as T1 (DS1) trunks using out-of-band signaling.

A loopback occurs when the transmit signal path is connected to the receive signal path on the T1 trunk.

Loopbacks can be performed at various points in a network. They are primarily used by maintenance personnel for doing diagnostics on the network. For example, if data on the T1 is corrupted, placing loopbacks at various points can isolate the fault.

In an intelligent T1 network, when a T1 failure occurs, the traffic that was carried on the failed T1 link can be switched onto a back-up or alternate T1 trunk. Once the failure is corrected, a switch back to the preferred route occurs.

When a T1 card detects faults on the T1 trunk and that its data is being corrupted, it enters an alarm state. The problem is that placing a loopback on that T1 trunk can cause the alarm to clear even though the failed trunk is not restored.

An object of the invention is to detect when a loopback has been placed on a trunk and thereby avoid switching back to a T1 trunk with an active loopback.

SUMMARY OF THE INVENTION

According to the present invention there is provided in a node connected to a TDM trunk having an incoming line carrying incoming channels and an outgoing line carrying outgoing channels, a method of detecting a loopback condition in said trunk from said node, comprising the steps of continually embedding a predetermined bit pattern unique to said trunk and said node in a predetermined one of said outgoing channels on said outgoing line providing a signalling channel, said predetermined bit pattern containing information identifying said node, and continually monitoring a corresponding incoming channel on said incoming line at said node to detect the presence of said predetermined bit pattern that is unique to said node and said trunk and thereby detect the presence of a loopback condition on said entire trunk.

The invention determines when a loopback has been placed on the T1. This information is used by equipment at the endpoints to determine if it is safe to switch back to the preferred T1 trunk. If there are loopbacks, then the traffic remains on the alternate route.

One of the main advantages of the invention is that it can detect fast loopbacks. A fast loopback is activated on the T1 trunk before the T1 enters an alarm state. The invention can detect loopbacks even when there is no discontinuity in the D4 or ESF framing bits.

Another advantage of the invention is that only the two endpoint nodes have to contain the loopback detection functionality. The tandem nodes do not have to support the Loopback Detection functionality. If a loopback is placed on the T1 trunk between nodes B and C, it will get detected by nodes A and D.

BRIEF DESCRIPTION OF THE DRAWINGS

The invention will now be described in more detail, by way of example only, with reference to the accompanying drawings, in which.

DETAILED DESCRIPTION OF THE DRAWINGS

Figure 1:
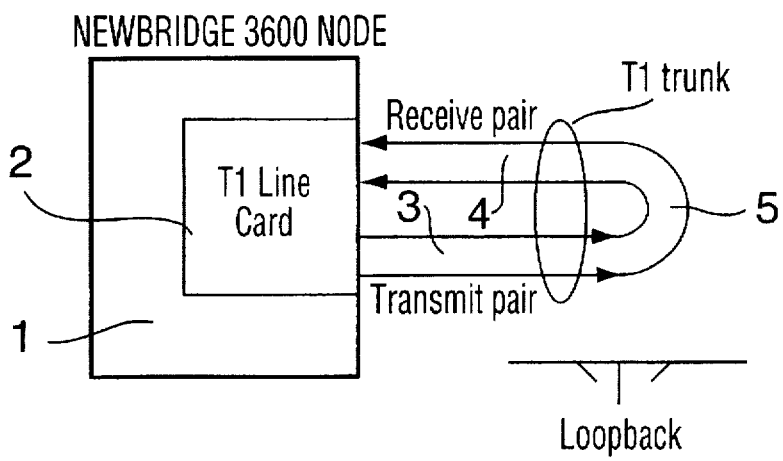
FIG. 1 illustrates a loopback on a T1 trunk.

Referring now to FIG. 1, this shows a node in a network, which in this case is a Newbridge Networks Corporation Mainstreet® 3600 multiplexer 1 connected to the transmit pair 3 and receive pair 4 of a T1 trunk.

A loopback has been placed between the transmit pair 3 and receive pair 4 for testing purposes.

Figure 2:
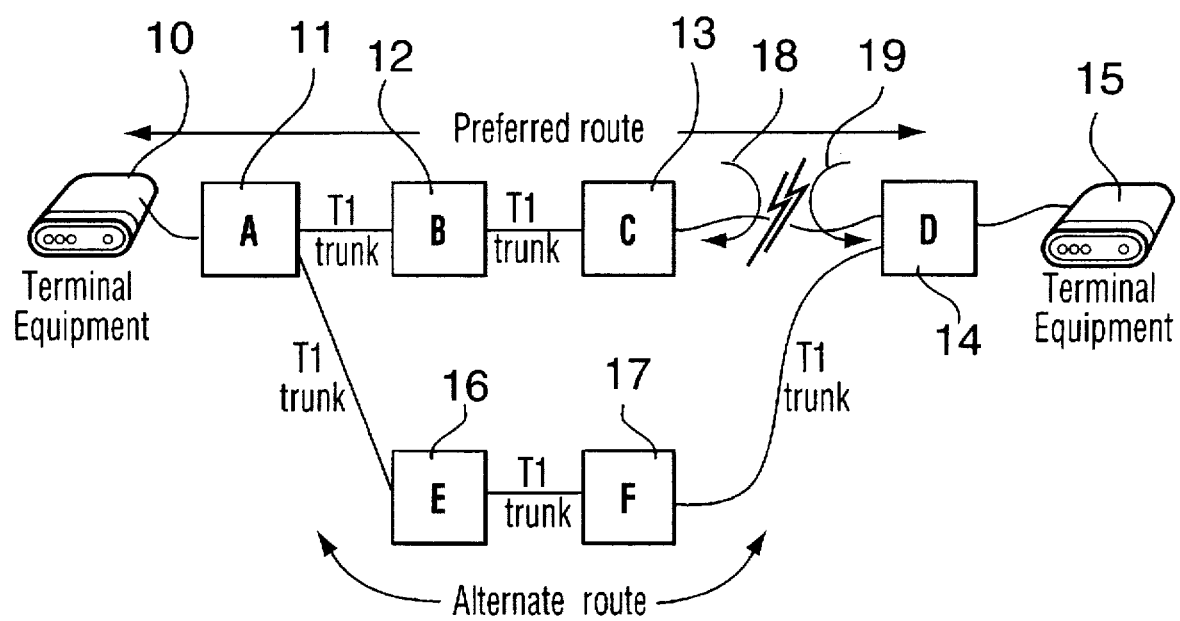
FIG. 2 illustrates a multi-hop setup with preferred and alternate routes.

An example of a network using preferred and alternate T1 trunks is shown in FIG. 2. Under normal conditions terminal equipment 10 communicates with terminal equipment 15 via the preferred route consisting of network nodes A, B, C, D) (11, 12, 13, 14).

In the event of a failure in the preferred path between nodes C and D, an alternate route is automatically set up via nodes E and F (16, 17) on the alternate route.

Thus when a path is established between endpoints 10 and 15 at nodes A and D over a preferred route A-B-C-D, and the T1 link between C-D experiences a failure, out-of-service signaling technology causes both endpoints to switch to the alternate route (A-E-F-D), and service is restored. Out-of-service alarms are generated at nodes C and D.

As a result of the failure, either a technician or some automated equipment will put loopbacks 18, 19 on the ends of the link where the failure occurred (i.e. between C and D) in order to isolate the fault.

However, the nodes then see a complete circuit, causing the alarms on the T1 cards on C-D T1 trunk to clear. As a result, the link appears to be restored even though in fact it is still down, and both endpoints switch back to the preferred route (A-B-C-D).

Since the preferred path is not really present, service to the circuit is not restored.

In accordance with the invention, a unique pattern is embedded in channel 24 of the T1 trunk and transmitted.

The T1 card of the receiving node monitors the incoming unique pattern, and if the T1 card sees its own pattern, then it knows a loopback has been placed somewhere on its connection path.

The unique pattern is a 16 bit pattern consisting of the following information:

- major node number of the equipment. For example, each Newbridge Networks Corp. 3600 Mainstreet® multiplexer is assigned a unique node number in a T1 network. The major node number is analogous to a unique address.
- slot in shelf. This is the physical slot in the card rack where the T1 interface card sits.
- T1 link number. Each T1 interface card can terminate multiple T1 trunks. This number identifies the T1 link.

The 16 bit pattern has the format shown in Table 1.

TABLE 1

| Bits | Description |
|---|---|
| P15–P14 | Link Address (range is 0–3) |
| P13–P10 | Slot in shelf (range is 0–15) |
| P9–P0 | Major Node Number (range is 1–1022) |

The unique pattern is preferably embedded in a Timeslot 24 (TS24) signaling frame that is carried in channel 24 of the T1 trunk. The unique pattern is located in bit 4 of the channel 24 and takes 24 frames to transmit. The unique pattern can be carried across networks using RBS or JB7 protocol on channel 24 and not get corrupted.

The T1 card will now be described in more detail with reference to FIGS. 3 and 4.

Figure 3:
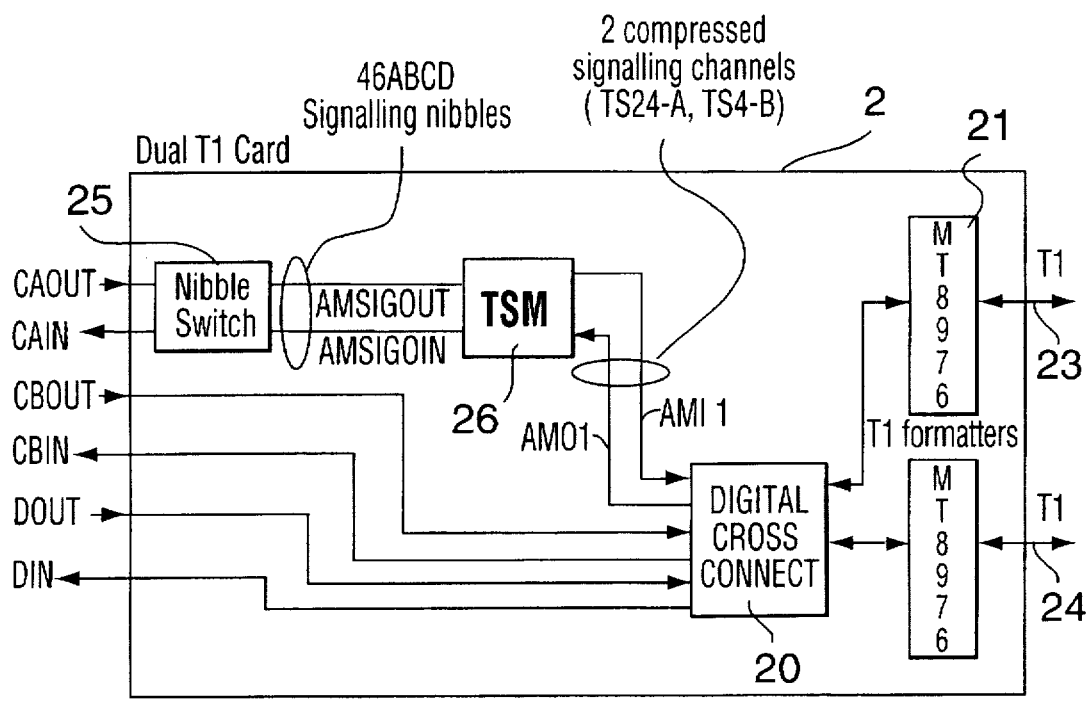
FIG. 3 is a functional block diagram of a Dual Ti card with timeslot 24 capability.

In FIG. 3, the dual T1 card 2 comprises a digital cross connect unit 20 connected to T1 formatters 21, 22, which in turn are connected to T1 trunks 23, 24. Nibble switch 25 is connected via TSM 26 (Timeslot signaling module) to the digital cross connect unit 20.

Figure 4:
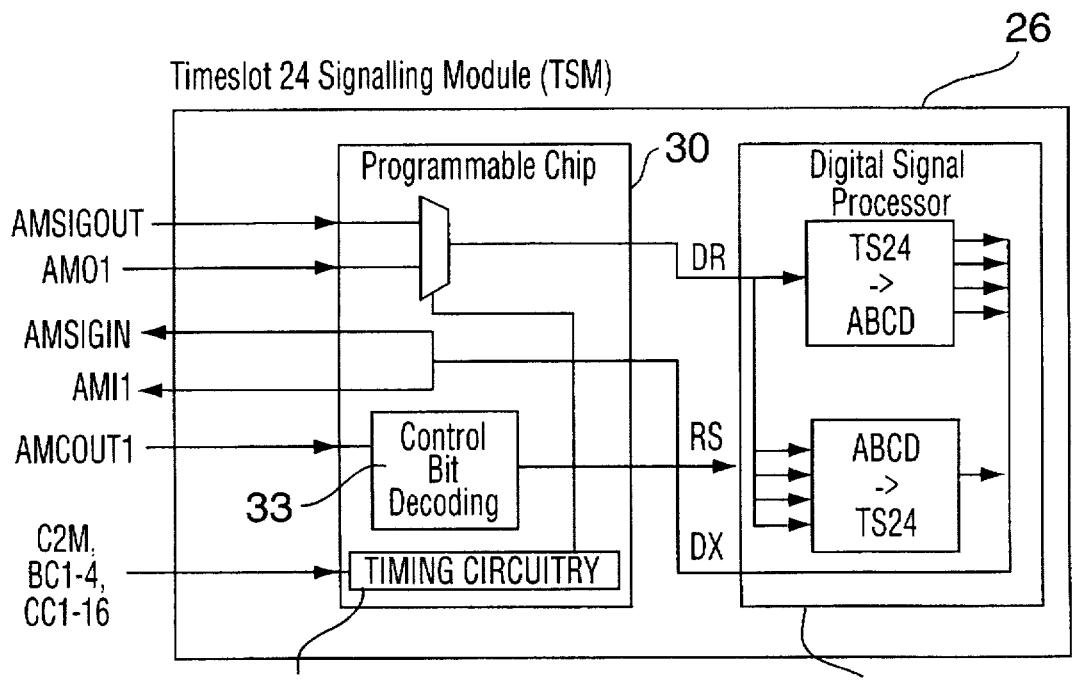
FIG. 4 is a functional block diagram of the time slot signaling module (TSM).

As shown in FIG. 4, the TSM 26 comprises a programmable unit 30, for example, a Xilinx® chip 30 and a digital signal processor 31, for example a TMS320C25®. Unit 30 includes timing circuitry 32, such as an ST-bus® timer, and control bit decoder 33. Unit 30 sends and receives Application Module Signaling signals on lines AMSIGOUT AND AMSIGIN.

The operation of the signaling system will now be described.

A multiframe format is used to carry the ABCD nibbles associated with DS-0s 1 to 23 in timeslot 24. The signaling channel is 64 kb/s. The format is based on a 24 frame multiframe. The 192 bits in the 24 frames are allocated as follows:

23 ABCD signaling nibbles (92 bits—30,666.67 b/s), multiframe alignment signal (48 bits—16,000 b/s).

alarm information (4 bits—1,333.33 b/s).

Loopback pattern (16 bits—5333 b/s)

Loopback channel sequence number (3 bits—1000 b/s)

undefined bits (29 bits—9666 b/s).

The timeslot 24 signaling channel is allocated 8 bits per T1 frame, providing a 64 kb/s channel. The bits are numbered 7 through 0 with bit 7 being transmitted first. The multiframe structure consists of 24 consecutive frames numbered 1 through 24.

The receiver uses a multiframe alignment signal to determine the frame number from the received data.

The format of the multiframe is shown in Table 1.

TABLE 1

| TS24 Frame Number | Bit Number | | | | Bit Number | | | |
|---|---|---|---|---|---|---|---|---|
| | 7 | 6 | 5 | 4 | 3 | 2 | 1 | 0 |
| 1 | A1 | A2 | 0 | i | A12 | A13 | 1 | U |
| 2 | A3 | A4 | 1 | S1 | A14 | A15 | 0 | U |
| 3 | A5 | A6 | 0 | S2 | A16 | A17 | 0 | U |
| 4 | A7 | A8 | 1 | U | A18 | A19 | 1 | U |
| 5 | A9 | A10 | 0 | U | A20 | A21 | 1 | U |
| 6 | A11 | M1 | 1 | U | A22 | A23 | 0 | U |
| 7 | B1 | B2 | 0 | U | B12 | B13 | 0 | U |
| 8 | B3 | B4 | 1 | U | B14 | B15 | 1 | U |
| 9 | B5 | B6 | 0 | P15 | B16 | B17 | 1 | U |
| 10 | B7 | B8 | 1 | P14 | B18 | B19 | 0 | U |
| 11 | B9 | B10 | 0 | P13 | B20 | B21 | 0 | U |
| 12 | B11 | M2 | 1 | P12 | B22 | B23 | 1 | U |
| 13 | C1 | C2 | 1 | P11 | C12 | C13 | 0 | U |
| 14 | C3 | C4 | 0 | P10 | C14 | C15 | 1 | U |
| 15 | C5 | C6 | 1 | P9 | C16 | C17 | 1 | U |
| 16 | C7 | C8 | 0 | P8 | C18 | C19 | 0 | U |
| 17 | C9 | C10 | 1 | P7 | C20 | C21 | 0 | U |
| 18 | C11 | M3 | 0 | P6 | C22 | C23 | 1 | U |
| 19 | D1 | D2 | 1 | P5 | D12 | D13 | 1 | U |
| 20 | D3 | D4 | 0 | P4 | D14 | D15 | 0 | U |
| 21 | D5 | D6 | 1 | P3 | D16 | D17 | 0 | U |
| 22 | D7 | D8 | 0 | P2 | D18 | D19 | 1 | U |
| 23 | D9 | D10 | 1 | P1 | D20 | D21 | 1 | U |
| 24 | D11 | M4 | 0 | P0 | D22 | D23 | 0 | U |

Ax=A bit for timeslot x

Ax=B bit for timeslot x

Cx=C bit for timeslot x (or a duplicate of Ax in D4 mode)

Dx=D bit for timeslot x (or a duplicate of Bx in D4 mode)

$Mx$ = Alarm bits (1 = Out of Frame)

$M1$ = Multiframe alignment alarm $M2 = M3$ = Unused (Sent as 0)

$M4$ = Summary alarm (= 1 if $M1$, $M2$ or $M3$ is active)

i=Inversion flag (0=bit 4 is complemented in multiframe, 1=non-complemented)

S2,S1=Multiframe sequence # (S1 being Least Significant, 11,10,01,00).

Ux=Undefined bits (currently sent as 1s, don't care on reception)

P16-P0=Loopback pattern

The ABCD signaling bits for circuits 1 through 11 on the T1 link are carried in bits 7 and 6, and the ABCD signaling bits for circuits 12 through 23 are carried in bits 3 and 2.

The same format is used in ESF and D4 applications. In D4 applications only the A and B bits are used, but the format of timeslot 24 and the operation of the module is not changed.

Since the multiframe length for the timeslot 24 channel is the same as the multiframe length for robbed bit signaling (24 frames for ABCD signaling, and 12 frames for AB signaling) switching from a T1 using robbed bit signaling to one using timeslot 24 signaling introduces no signaling distortion.

The multiframe alignment (MFA) signal is carried in bits 5 and 1. The MFA in bit 1 is designed to allow the framing algorithm to quickly determine if a wrong bit was due to a repeated frame slip, a deleted frame slip, or a bit error. The multiframes in the TS24 channel are not aligned with the multiframe defined by the framing bit of the 1544 kb/s stream.

There are 4 alarm bits allocated in the TS24 multiframe. Bit M1 transmits a distant alarm to the remote end when the near end TS24 framer is in an out-of-multiframe alignment state. M1=1 indicates that the framer is not in multiframe alignment; M1=0 indicates that the framer is in multiframe alignment (the normal condition). M2 and M3 are currently undefined, and are set to 0's. M4 is a summary alarm and is set by the transmitter whenever bits M1, M2, or M3 are set.

Bit 4 of the TS24 channel is used for loopback detection. Bit 4 of the TS24 channel is defined as the Loopback Information Channel (LIC). The 16 last bits of the LIC are used to carry the unique pattern on the link. If the same unique pattern is received, it means that there is a loopback on the link.

In order to avoid mimicking the T1 framing pattern, the data on the LIC is complemented every multiframe. All 24 bits of the multiframe are complemented. Bit 0 of every multiframe indicates the correct polarity (1=non complemented, 0=complemented).

Bits 2 and 3 of the LIC form a multiframe sequence number. The present embodiment generates only sequence numbers=3 (11 binary). Multiframes received with sequence numbers other than 3 are discarded. Future embodiments could use other address bits to send extra information that will be ignored by older systems.

Loss of multiframe alignment is declared when 2 out of 4 multiframe alignment bits are in error. When TS24 signaling multiframe alignment is lost, the receiver will freeze the values of the ABCD nibbles that it drives towards the backplane until multiframe alignment is regained. As a special case of this, when the TSM is brought out of reset, it will drive zeros on all ABCD signaling nibbles until multiframe alignment is initially established.

Multiframe alignment is declared when 24 consecutive valid TS24 framing bits have been detected, beginning with the first frame of the multiframe. When multiframe alignment is declared, updating of the ABCD signaling nibbles on AM.SigIn (according to the debouncing algorithm) will be enabled.

Loss of multiframe alignment is an internal state of the TSM, and is not equivalent to the TS24 framing alarm state.

A TS24 Framing alarm is declared when multiframe alignment has been lost continuously for $T_{fd}$. The TS24 Framing alarm will be cleared when multiframe alignment has been present continuously for $T_{fc}$.

When the receiver is in the loss of multiframe alignment state, the transmitter will set the M1 bit in the outgoing signaling channel. A TS24 Distant alarm will be declared when the incoming M1 bit has been set for 0.6s continuously, and will be cleared when the incoming M1 bit has been clear for 0.6s continuously.

In this implementation, the M2 and M3 bits are always set to zero, and the M4 bit follows the value of the M1 bit.

The ABCD nibbles sent to the Dual T1 card are debounced for 6 to 9 ms. The algorithm waits for the A, B, C, and D bits associated with a given timeslot to match in three consecutive multiframes before updating the values being sent on the ST-BUS. This is similar to the algorithm used by the MT8976 T1/ESF Framer in robbed bit signaling mode.

Transitions of the ABCD bits read from the ST-BUS are not debounced before being sent to the outgoing TS24 signaling channel.

The loopback pattern consists of a 16-bit unique pattern as described above. The bits' meanings are as follows:

Valid loopback patterns: Loopback patterns 0000 and FFFF are illegal. This is to avoid simulation of a pattern by a dead T1 line or by old TS24 Software (transmitting Undefined bits 1 as the pattern).

The system will never send pattern 0000 or FFFF since the major node # is from 1 to 1023.

Rate of sampling from TSM: the TSM will sample the ST-BUS interface and will update the transmitted pattern every 3 ms. This mean that the pattern transmitted on the TS24 channel will follow in real-time the pattern sent on the ST-BUS by the DT1 processor.

The DSP is responsible for reception of the pattern. Here are the peculiarities of the reception algorithm:

Rate of update by TSM: The TSM will update the loopback pattern sent to the DT1 (via ST-BUS) every 3 ms. No debouncing is provided.

Effect of Slips: Each slip will cause 1 loopback pattern to be wrong. In some cases, a slip will cause the TSM to 'not update' the pattern for a period of 3 ms.

Effect of TSM Frame Misalignment: When the TSM loses frame alignment (internal state of the TS24 receiver), it stops updating the ST-BUS loopback pattern. The last value sent will likely be bad. It is up to the DT1 processor to use the 'L' indication bit (see table 2) to stop the debouncing algorithm. When getting back in frame alignment, the first pattern sent will likely be good.

The TS24 Loopback Detection method uses the following state machine. The state machine is called once every 100 ms to implement the required task.

TABLE 2

| CURRENT STATE | EXECUTION EVERY POLLING PERIOD Tpoll |
|---|---|
| Deb_Loopbk | T=T+Tpoll<br>IF (rx=tx)<br>  IF (T > Tdeclare)<br>    T=0<br>    Loopback Alarm=Present<br>    NextState=Lpbk_Detect<br>  ELSE ( T <= Tdeclare)<br>    Next State=Deb_Loopbk<br>  ENDIF<br>ELSE ( rx <> tx)<br>  T=0<br>  NextState=Non_Loopbk<br>ENDIF |
| Lpbk_Detect | T=T+Tpoll<br>IF (rx = tx)<br>  T=0<br>  NextState=Lpbk_Detect<br>ELSE (rx <> tx)<br>  T=0<br>  NextState=DebNonLpbk<br>ENDIF |
| DebNonLpbk | T=T+Tpoll<br>IF (rx = tx)<br>  T=0<br>  NextState=Lpbk_Detect<br>ELSE (rx <> tx)<br>  IF (T > Tclear)<br>    T=0<br>    Loopback Alarm=absent<br>    NextState=Non_Loopbk<br>  ELSE (T <= Tclear)<br>    Next Stat e=DebNonLpbk<br>  ENDIF<br>ENDIF |
| Non_Loopbk | T=T+Tpoll<br>IF (rx = tx)<br>  T=0<br>  NextState=Deb_Loopbk<br>ELSE (rx <> tx)<br>  T=0<br>  NextState=Non_Loopbk<br>ENDIF | where

Tpoll=period of polling=100 milliseconds
Tdeclare=alarm declare time=1 second
Tclear=alarm clear time=10 seconds
rx=received unique pattern
tx=transmitted unique pattern

We claim:

1. In a node connected to a primary TDM trunk defining a preferred route and a secondary trunk defining an alternate route for use in the event of a failure on said primary trunk, said primary trunk having an incoming line carrying a plurality of data channels and a signaling channel, and an outgoing line carrying a plurality of data channels and a signaling channel, a method of preventing premature switching back to said primary trunk following a failure thereon by detecting a loopback condition in said primary trunk from said node, comprising the steps of continually embedding a predetermined bit pattern unique to said trunk and said node in said signaling channel on said outgoing line, said predetermined bit pattern containing information identifying said node, and continually monitoring said signaling channel on said incoming line at said node to detect the presence of said predetermined bit pattern that is unique to said node and said trunk and thereby detect the presence of a loopback condition on said entire primary trunk.

2. In a node having an interface card identified by link number connected to a primary TDM trunk defining a preferred route and a secondary trunk defining an alternate route for use in the event of a failure on said primary trunk, said primary trunk having an incoming line carrying a plurality of data channels and a signaling channel, and an outgoing line carrying a plurality of data channels and a signaling channel, a method of preventing premature switching back to said primary trunk following a failure thereon by detecting a loopback condition in said entire primary trunk from said node, comprising the steps of continually embedding a predetermined bit pattern unique to said trunk and said node in said signaling channel on said outgoing line, and continually monitoring said signaling channel on said incoming line at said node to detect the presence of said predetermined bit pattern that is unique to said node and said trunk, wherein said predetermined bit pattern contains information identifying the transmitting node, the trunk interface card, and the link number for the interface card.

3. A method as claimed in claim 2, wherein said trunk is a T1 trunk.

4. In a node connected to a primary TDM trunk defining a preferred route and a secondary trunk defining an alternate route for use in the event of a failure on said primary trunk, said primary trunk having an incoming line carrying a plurality of data channels and a signaling channel, and an outgoing line carrying a plurality of data channels and a signaling channel, a method of preventing premature switching back to said primary trunk following a failure thereon by detecting a loopback condition in said primary trunk from said node, comprising the steps of embedding a predetermined bit pattern unique to said trunk and said node in said signaling channel on said outgoing line and continually monitoring said signaling channel on said incoming line at said node to detect the presence of said unique predetermined bit pattern that is unique to said node and said trunk, wherein the primary TDM trunk has a multiframe structure and said predetermined bit pattern is distributed over a plurality of frames defining a multiframe.

5. A method as claimed in claim 4, wherein the data representing said bit pattern are complemented every multiframe to avoid mimicking a framing pattern of the trunk.

* * * * *